(12) United States Patent
Venkiteswaran et al.

(10) Patent No.: US 9,280,359 B2
(45) Date of Patent: Mar. 8, 2016

(54) SYSTEM AND METHOD FOR SELECTING A LEAST COST PATH FOR PERFORMING A NETWORK BOOT IN A DATA CENTER NETWORK ENVIRONMENT

(71) Applicants: Manikantan Venkiteswaran, Karnataka (IN); Kumar Sidhartha, Karnataka (IN); Mehul J. Bhatt, Karnataka (IN)

(72) Inventors: Manikantan Venkiteswaran, Karnataka (IN); Kumar Sidhartha, Karnataka (IN); Mehul J. Bhatt, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 409 days.

(21) Appl. No.: 13/711,031

(22) Filed: Dec. 11, 2012

(65) Prior Publication Data

US 2014/0164752 A1    Jun. 12, 2014

(51) Int. Cl.
*G06F 9/00*        (2006.01)
*G06F 9/44*        (2006.01)

(52) U.S. Cl.
CPC .......... *G06F 9/4416* (2013.01); *G06F 9/4401* (2013.01)

(58) Field of Classification Search
CPC .......... G06F 9/4406; G06F 12/00; G06F 3/00
USPC .......................................................... 713/300
See application file for complete search history.

(56) References Cited

U.S. PATENT DOCUMENTS

| 6,802,021 | B1 * | 10/2004 | Cheng et al. ............... 714/4.11 |
| 7,496,745 | B1 * | 2/2009 | Lok et al. ................... 713/2 |
| 7,668,981 | B1 * | 2/2010 | Nagineni et al. ............ 710/38 |
| 7,673,132 | B2 | 3/2010 | Chu et al. |
| 7,783,788 | B1 * | 8/2010 | Quinn et al. ................ 710/8 |
| 8,015,397 | B2 | 9/2011 | Sevak |
| 8,312,115 | B2 | 11/2012 | Lipscombe et al. |
| 2001/0016904 | A1 * | 8/2001 | Hall ........................... 713/1 |
| 2002/0156931 | A1 * | 10/2002 | Riedel ......................... 709/313 |
| 2004/0107300 | A1 * | 6/2004 | Padmanabhan et al. ....... 710/1 |
| 2004/0215952 | A1 * | 10/2004 | Oguma ....................... 713/1 |
| 2005/0228950 | A1 * | 10/2005 | Karr .......................... 711/114 |
| 2006/0218388 | A1 * | 9/2006 | Zur et al. ................... 713/2 |
| 2007/0143583 | A1 * | 6/2007 | Cors et al. ................... 713/1 |
| 2008/0270644 | A1 * | 10/2008 | Rooney et al. .............. 710/38 |
| 2010/0299452 | A1 * | 11/2010 | Flammer et al. ........... 709/241 |
| 2011/0296160 | A1 * | 12/2011 | Hatasaki et al. ........... 713/2 |
| 2012/0102313 | A1 * | 4/2012 | Nicolson et al. ........... 713/2 |
| 2012/0124414 | A1 * | 5/2012 | Dallas et al. .............. 714/6.2 |
| 2013/0007741 | A1 * | 1/2013 | Britsch et al. .............. 718/1 |
| 2013/0151646 | A1 * | 6/2013 | Chidambaram et al. ...... 709/213 |

* cited by examiner

*Primary Examiner* — Thomas Lee
*Assistant Examiner* — Volvick Derose
(74) *Attorney, Agent, or Firm* — Patent Capital Group (57) ABSTRACT

A method is provided in one example embodiment and includes logging in to a multipath target via first and second boot devices instantiated on a network device, the first and second boot devices respectively connected to the multipath target via first and second paths; determining which of the first and second paths comprises a least cost path; and booting the operating system via the least cost path. The determining may include comparing network statistics of the first path with network statistics of the second path, the network statistics comprising at least one of packet loss on the path, errors encountered via the path, and congestion on the path.

17 Claims, 5 Drawing Sheets

FIG. 5

SYSTEM AND METHOD FOR SELECTING A LEAST COST PATH FOR PERFORMING A NETWORK BOOT IN A DATA CENTER NETWORK ENVIRONMENT

TECHNICAL FIELD

This disclosure relates generally to techniques for performing a network boot in a data center environment and, more particularly, to techniques for dynamically selecting a least cost path for performing a network boot in a data center network environment.

BACKGROUND

Booting network servers from a storage area network ("SAN") has become increasingly common in complex data center environments. This can be attributed to the significant benefits of SAN boot, or iSCSI boot, over traditional local disk booting, which include maximizing consolidation of IT resources, reducing equipment costs, and realization of considerable management benefits due to centralization of the boot process. Booting from a SAN, diskless servers can be deployed in an environment in which a boot disk is located on a storage device connected to the SAN; in many cases, the storage device may be RAID-capable. The server ("initiator") communicates with the storage device connected to the SAN on which the boot disk is located ("boot target" or "target"). The server/initiator communicates with the storage device/boot target through the SAN via either a Fibre Channel host bus adapter ("HBA") or an Internet small computer systems interface ("iSCSI") network interface card ("NIC").

A typical boot policy deployed by a server manager will include information regarding the boot target ID, which in the case of an iSCSI SAN is the IP address of the target. In a normal boot scenario, the initiator will have instantiated thereon two boot devices, comprising either virtual NICs ("vNICs"), in the case of iSCSI, or virtual HBAs ("vHBAs"), in the case of fibre channel ("FC"), multi-pathed to the boot target. Each of the paths will be connected through a separate physical link to the target. A static priority is set in connection with the boot devices to ensure that boot up occurs through a particular one of the boot devices first and then through the other boot device if boot up cannot occur through the first device for some reason. The priority could be based on peripheral component interconnect ("PCI") enumeration order, so that the device that has the lowest PCI order executes the option ROM first. One drawback to a static priority methodology such as this is that neither the boot devices nor the boot process has any knowledge of the traffic patterns occurring in the network and therefore cannot dynamically switch to a least cost path even though one might be available.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes logging in to a multipath target via first and second boot devices instantiated on a network device, the first and second boot devices respectively connected to the multipath target via first and second paths. The first and second boot devices could be any suitable element, component, or object (e.g., adapters, drivers, interface cards, software, server equipment (e.g., server blades), virtual elements, peripheral devices, computer programs, firmware, etc.). The method can also include determining which of the first and second paths comprises a least cost path; and booting the operating system via the determined least cost path. The determining may include comparing network statistics of the first path with network statistics of the second path, the network statistics comprising at least one of packet loss on the path, errors encountered via the path, and congestion on the path. The determining may also include determining an amount of time needed to perform boot LUN discovery via each of the first and second paths. The determining may still further include determining whether boot logical unit number ("LUN") discovery was successful via the first and second paths and, if boot LUN discovery is successful via one of the first and second paths, booting the operating system via the one of the first and second paths. The booting may comprise installing a boot firmware table on the least cost path. In one embodiment, the first and second boot devices comprise network virtual interface cards ("vNICs") instantiated by a virtualized adapter. In another embodiment, the first and second boot devices comprise virtual host bus adapters ("vHBAs") instantiated by a virtualized adapter. The multipath target may comprise a storage array, while the network device may comprise a server.

Example Embodiments

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
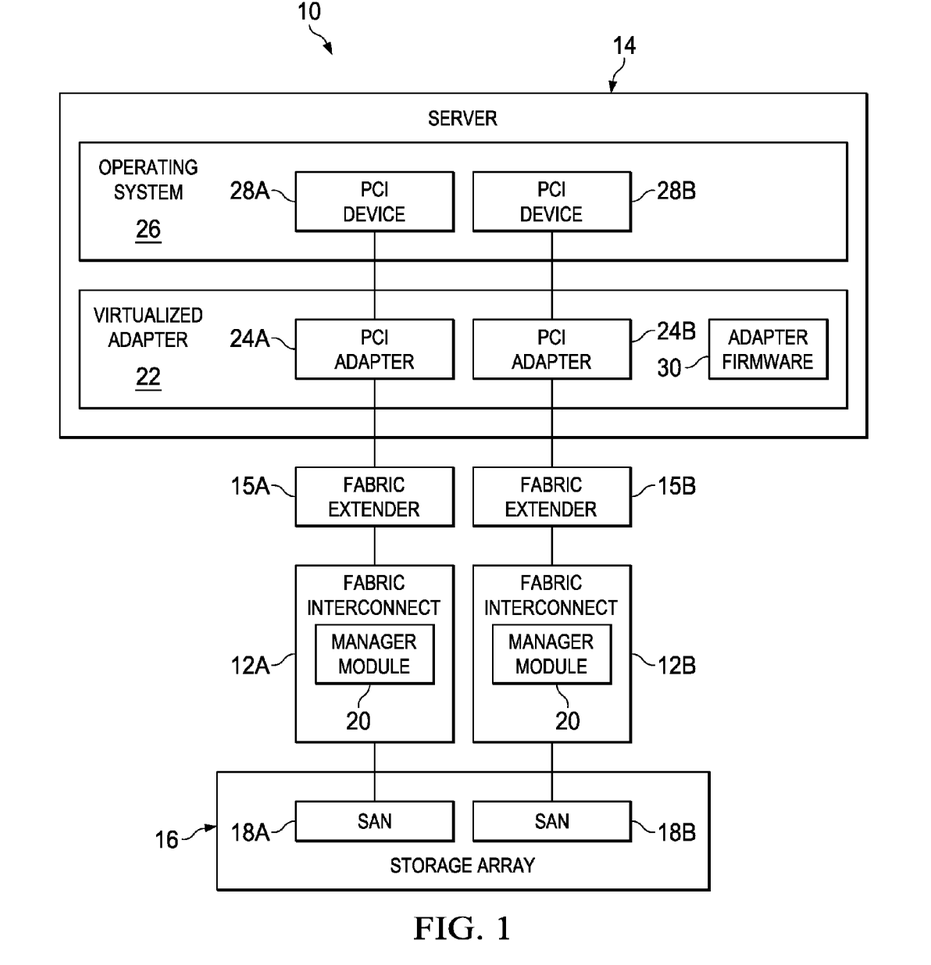
FIG. 1 is a simplified block diagram of a system for selecting a least cost path for performing a network boot in a data center environment in accordance with one embodiment of the present disclosure.

Turning to FIG. 1, illustrated therein is a simplified block diagram of a system 10 for selecting a least cost path for booting a server from a SAN. As shown in FIG. 1, the system 10 includes a pair of switching devices 12A, 12B, for connecting a server 14 to external storage devices arranged as a storage array 16. The switching devices 12A, 12B, may be implemented as fabric interconnects, which as described in greater detail below support both FC and Ethernet protocols. Additionally, although not necessary to operation of the system 10, one or more fabric extenders 15A, 15B, may also be provided. The primary function of the fabric extenders 15A, 15B, is to increase the number of physical ports available in the system 10, thereby increasing the number of servers, such as the server 14 that may be connected to the system. The servers, including the server 14, may be connected to the switching devices 12A, 12B, either directly or through the fabric extenders 15A, 15B.

In one embodiment, the storage array 16 includes a first SAN 18A, to which the server 14 is connected via the switch 12A, and a second SAN 18B, to which the server 14 is connected via the switch 12B. Each SAN 18A, 18B, may comprise a dedicated network for providing access to consolidated data storage. In general, SANs make storage devices, such as disk arrays, for example, accessible to servers in a manner in which the storage devices appear to be logically attached to the operating system of the server. The disk arrays may be provisioned as logical unit numbers ("LUNs"). A LUN is a number used to identify a logical unit, which is a device addressed by the SCSI protocol or protocols that encapsulate SCSI, such as FC or iSCSI. A LUN may be used in connection with any device that supports read/write operations, but is most often used to refer to a logical disk created on a SAN. SANs typically have their own network of storage devices that are generally not accessible by other devices through a local area network ("LAN"). In accordance with embodiments described herein, the server 14 may be booted from the SAN 18A or the SAN 18B. Additionally, although the SANs 18A and 18B are shown and described herein as comprising distinct entities, it is anticipated that a single SAN may be employed in place of the two individual SANs, in which case the server 14 would be connected to the same SAN through both switches 12A and 12B and the boot target would comprise a single SAN.

In one embodiment, the system 10 is implemented in accordance with the Cisco Unified Computing System ("UCS") architecture developed by Cisco Systems, Inc., of San Jose, Calif. In general, UCS is data center platform that unites compute, network storage access, and virtualization into a single cohesive system designed to decrease implementation costs and increase agility. UCS may support automatic in-band discovery of computers, or servers, and their components, including FC storage adapters. Further, UCS may maintain an inventory of the discovered servers, monitoring the health of the discovered servers. These processes occur without the user being required to enter any device credentials. Additionally, UCS may provide inventory reports to users and provides a role-based access control ("RBAC") system, such that provisioning tasks can be separated, for example between server administrators and storage administrators. A fully redundant UCS system includes two independent fabric planes: Fabric A and Fabric B. Each plane includes a central fabric interconnected connected to an input/output ("I/O") module, implemented as a fabric extender, in each blade server chassis. The two fabric interconnects are completely independent from the perspective of the data plane. Cisco UCS can function with a single fabric interconnect if the other fabric is offline or not provisioned.

UCS is inherently stateless, with logical configuration specifications referred to as service profiles dictating every aspect of server provisioning, including I/O configurations, firmware revisions, and settings, thereby speeding up virtual infrastructure provisioning. Once created, a service profile can be deployed on any physical server that supports the logical configuration requirements. The service profile may also specify whether to use the worldwide name ("WWN") addresses burned in the server hardware or to substitute virtual WWN addresses therefor. Logical servers can be defined even if no physical server is connected. In this manner, UCS enables logical servers to be deployed over physical servers, which causes the physical server to be configured as specified in the service profile, including WWN addresses for storage adapters. UCS uses a standards-based, low-latency, high-bandwidth 10 Gigabit Ethernet and Fibre Channel over Ethernet ("FCoE") network for all traffic, communications, and storage. UCS thereby simplifies connectivity to the storage array by interconnecting UCS servers as a single system and linking that system directly to the Ethernet and FC aggregation layer.

In one embodiment, the compute component of UCS comprises a powered server chassis and multiple full or half slot bade servers. The compute hardware is managed by a UCS manager module 20 embedded in each of the fabric interconnects 12A, 12B, for purposes that will be described in greater detail hereinbelow. UCS supports a variety of hypervisors, including, for example, VMware ESX and ESXi, both available from VMware, Inc., of Palo Alto, Calif., Hyper-V, available from Microsoft Corporation of Redmond, Wash., and XenServer, available from Citrix Systems, Inc., of Fort Lauderdale, Fla., to name just a few. VMware ESX and ESXi are "bare metal" hypervisors, which run directly on the server hardware without the need for any other software and provide the necessary functions to host several guest OSes on the physical server. Additionally, virtual network interface cards ("vNICs") may employ technology that provides VMs direct access to the server hardware for improved performance and network visibility.

As previously noted, the fabric interconnects 12A, 12B, which may be implemented using Nexus 6100 or 6200 series switches, available from Cisco Systems, Inc., provide network connectivity for the servers connected to it through 10 Gigabit and fiber channel over Ethernet ("FCoE"). The FCoE component is necessary for connecting to the storage array since the servers typically have very little storage themselves. Each fabric interconnect can further connect to multiple fabric extenders, which may be implemented using Nexus 2100 series fabric interconnects comprising port extenders allowing up to 160 servers to be managed by a single fabric interconnect. In one embodiment, each fabric interconnect includes physical ports to which up to 20 server chassis, which may be implemented using Cisco 5100 series blade server chassis, can be connected. Each chassis can hold up to eight ½ width blade servers or four full width blade servers; therefore, a total of up to 160 (½-blade) servers can be connected to each switch.

In a UCS system, system devices are managed via the UCS manager modules 20 embedded in the fabric interconnects 12A, 12B. The fabric interconnects may be accessed by a server administrator through an Internet browser, such as Microsoft Internet Explorer or Firefox, for example, through a CLI management program, or through an API. Virtual machines ("VMs") may be moved from one physical chassis to another. Similarly, applications can be moved between VMs.

UCS is a stateless computing system. In particular, each compute node has no set configuration. MAC addresses, UUIDs, firmware, and BIOS settings, for example, are all configured via the UCS manager module via service profiles applied to the servers, such as the server 14. This enables consistent configuration and facilitates repurposing of servers, as a new service profile can be applied to a server in a manner of minutes.

Referring again to FIG. 1, in accordance with features of one embodiment, the server 14 includes a virtualized adapter 22, which is a physical adapter that can perform PCI virtualization by dynamically instantiating PCI devices on the server. The virtualized adapter 22 may be designed for both single OS and VM-based deployments, supporting network interface virtualization and VN-link capable hypervisor integration. In particular, the virtualized adapter 22 can be used to provision more than 100 virtual PCI adapters, represented in FIG. 1 by adapters, or boot devices, 24A, 24B, which may comprise virtual network interface cards ("vNICs") and virtual host bus adapters ("vHBAs"), each of which has its own characteristics and can be used for networking or storage. In the illustrated embodiment, each adapter 24A, 24B, is exposed to an OS 26 of the server 14 as a PCI device 28A, 28B. In one embodiment, the virtualized adapter is implemented as a Cisco UCS 1280 virtual interface card ("VIC") available from Cisco Systems, Inc. For purposes that will be explained in detail below, adapter firmware 30 is embedded in and executed by the virtualized adapter 22.

As previously noted, in one embodiment, the virtualized adapter 22 is able to instantiate multiple FC vHBAs and/or multiple Ethernet vNICs from a single physical adapter (i.e., adapter 22). In one embodiment, the OS 26 may comprise a bare metal hypervisor. In another embodiment, such as that illustrated in FIG. 1, the OS 26 may be implemented on bare metal, in which case a hypervisor (not shown) would be implemented on top of the OS 26. In either case, in a standard SAN deployment, the virtualized adapter may instantiate one or more vHBAs on the server. vHBAs exposed to the bare-metal OS or hypervisor are used to send and receive FC traffic. Similarly, the virtualized adapter may instantiate one or more vNICs on the server. vNICs exposed to the bare-metal OS or hypervisor are used to send and receive Ethernet traffic.

In one embodiment, the UCS manager module 20 exposes a compute and storage abstraction to the user. In particular, the UCS manager module 20 provides a single point of management for compute and storage provisioning. In one embodiment, service profiles comprise the fundamental mechanism by which the system 10 models the necessary abstractions of computer, storage, and networking. Conceptually, a service profile is an extension of the VM abstraction applied to physical servers. The definition has been expanded to include elements of the environment that span the entire data center, encapsulating the server identity in logical service profiles that can be dynamically created and associated with any physical server in the system within minutes. The association of service profiles with physical servers is performed as a simple, single operation and enables migration of identities between servers without requiring any physical configuration changes and facilitates rapid bare-metal provisioning of replacements for failed servers. Every server that is provisioned in the system 10 is specified by a service profile. A service profile is a software definition of a server and its LAN and SAN network connectivity; in other words, a service profile defines a single server and its storage and networking characteristics. Service profiles are stored in the fabric interconnects. When a service profile is deployed to a server, the UCS manager module automatically configures the server, adapters, fabric extenders, and fabric interconnects to match the configuration specified in the service profile. This automation of device configuration reduces the number of manual steps required to configure servers, network interface cards ("NICs"), host bus adapters ("HBAs"), and local area network ("LAN") and SAN switches.

Figure 2A:
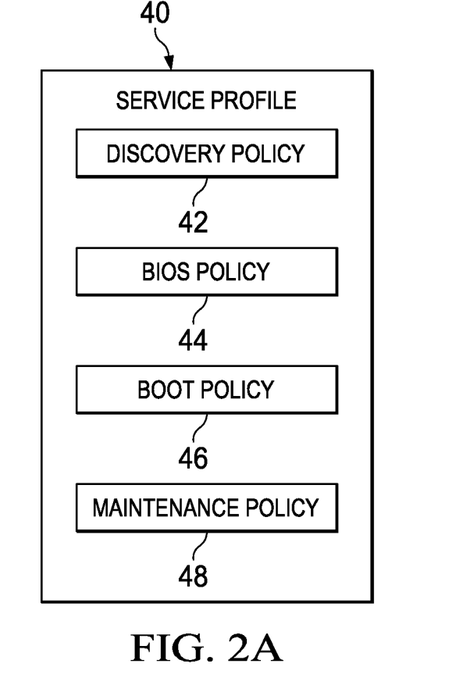
FIG. 2A illustrates a simplified depiction of a service profile associated with a server in a data center environment.
Figure 2B:
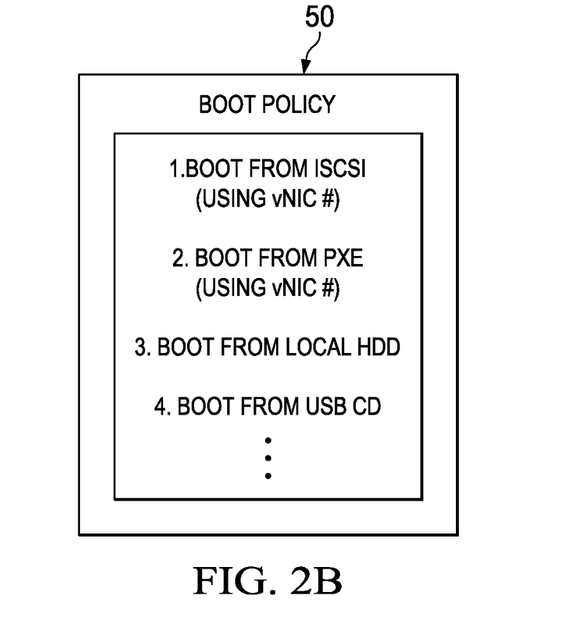
FIG. 2B illustrates a simplified depiction of a static boot policy specified by a service policy associated with a server in a data center.

FIG. 2A illustrates a simplified depiction of a service profile 40. As shown in FIG. 2A, the service profile 40 includes a discovery policy 42, a BIOS policy 44, a boot policy 46, and maintenance policy 48. It will be recognized that the contents of the service profile 40 as shown in FIG. 2A are illustrative only and that other information and policies may be advantageously included therein. FIG. 2B illustrates a simplified depiction of a static boot policy 50 that specifies an order in which network boot should be attempted from various devices. For example, the static boot policy 50 specifies that boot should first be attempted from iSCSI using a designated vNIC. If the iSCSI boot from the specified vNIC fails, boot should be attempted from PXE using a specified vNIC. If the PXE boot fails, boot from local hard disk drive ("HDD") should be attempted. If HDD boot fails, boot should be attempted from a compact disk drive connected to a USB port, and so on. It will be noted that the static boot policy 50 does not consider least cost path in determining which device from which to boot.

In addition to the boot priority information shown in FIG. 2B, a typical boot policy will include information regarding the boot target ID (which will be an IP address in the case of iSCSI boot), a LUN ID, and a priority attached to the target. The boot policy is applied to a boot device (vNIC or vHBA) instantiated on the server. In a normal boot scenario, there will be two devices (either vNICs or vHBAs) multi-pathed to the target. Each of the paths will be connected through a separate physical link to the target. Historically, a user has set a static priority on the boot device to make sure that boot occurs through a particular device. The priority could be based on PCI enumeration order, so that the device with the lowest PCI order executes the option ROM first. With this technique, however, neither the boot device nor the boot process have any knowledge of traffic patterns in the system and cannot dynamically switch to a least cost path, even though one might be available.

In contrast, and in accordance with features of one embodiment, a virtualized adapter runs the option ROM (such as iSCSI) on all boot devices that are marked for iSCSI boot. The iSCSI initiator stack running on the virtual adapter logs into the target and discovers the LUN. It then reports the initiator, target, and LUN information to the option ROM driver. Two new attributes are used in the UCS manager module 20 to specify whether the boot devices are to be dynamically adjusted and the weight of various prioritization criteria, thereby enabling dynamic boot prioritization. Dynamic prioritization criteria may include one or more of the following: (1) time difference (in milliseconds) between login to boot target through each of the two different paths; (2) boot device uplink pin and bandwidth usage on the uplinks; and (3) boot link uplink pin and error statistics on the uplinks. When a boot policy that has dynamic prioritization enabled is invoked, the UCS manger module will request the boot firmware of the virtualized adapter (i.e., the "adapter firmware") to measure the time elapsed between the instantiation of the option ROM and the LUN discovery for each path. Next, the adapter firmware will determine the time difference for LUN discovery between the two boot devices in the boot policy and obtain information about bandwidth usage on relevant class of service ("COS") for uplinks from the access switch comprising fabric interconnects. Additionally, using the policy specified by the UCS manager module and dynamic information obtained at boot time, the boot firmware will post initiator/target and LUN information, as well as the iSCSI boot firmware table ("iBFT") only on the path that exhibits least cost. In particular, the iBFT is created in memory of the virtualized adapter to expose information about the iSCSI connection so that the OS setup is able to determine that the attached device is bootable.

Figure 3:
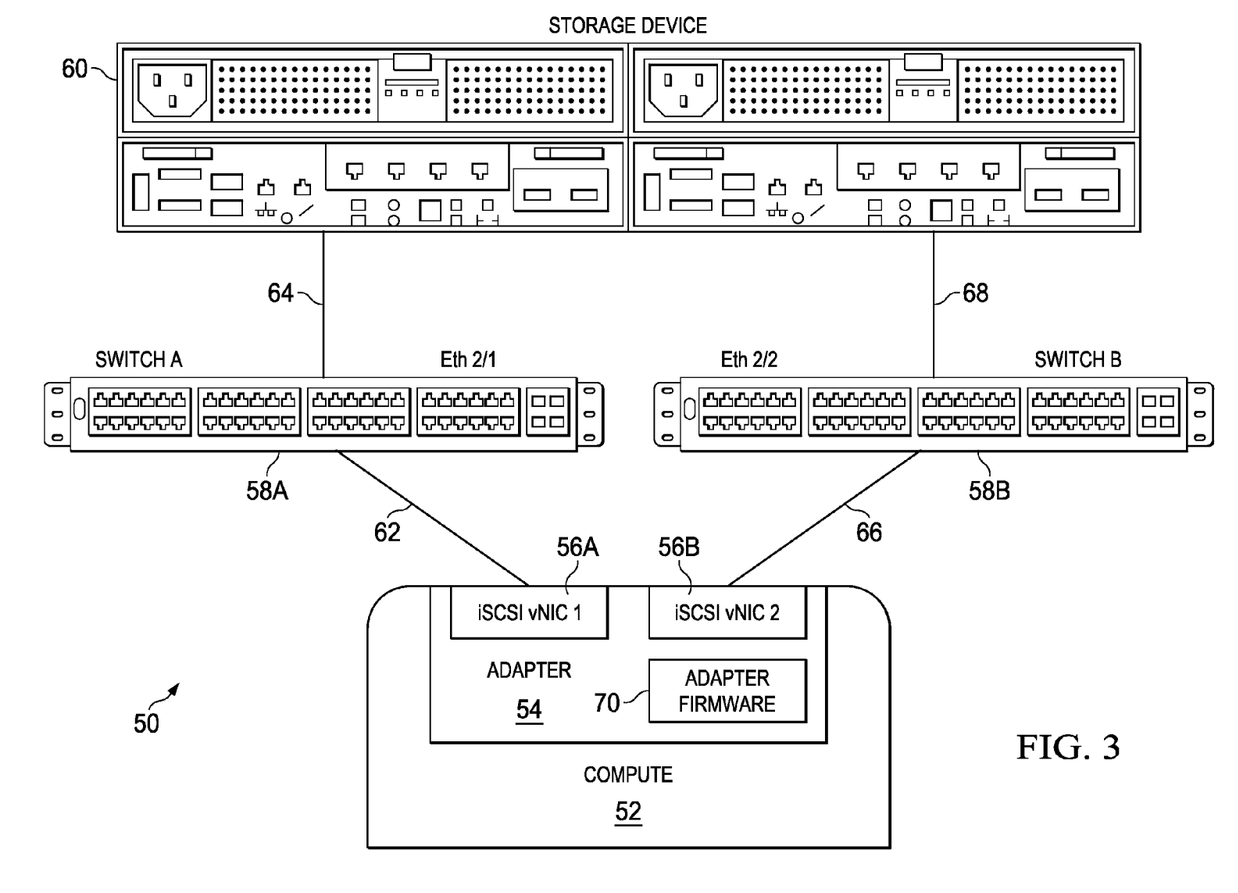
FIG. 3 illustrates a simplified block diagram of a system for selecting a least cost path for performing a network boot over Ethernet in a data center environment in accordance with one embodiment of the present disclosure.
Figure 4:
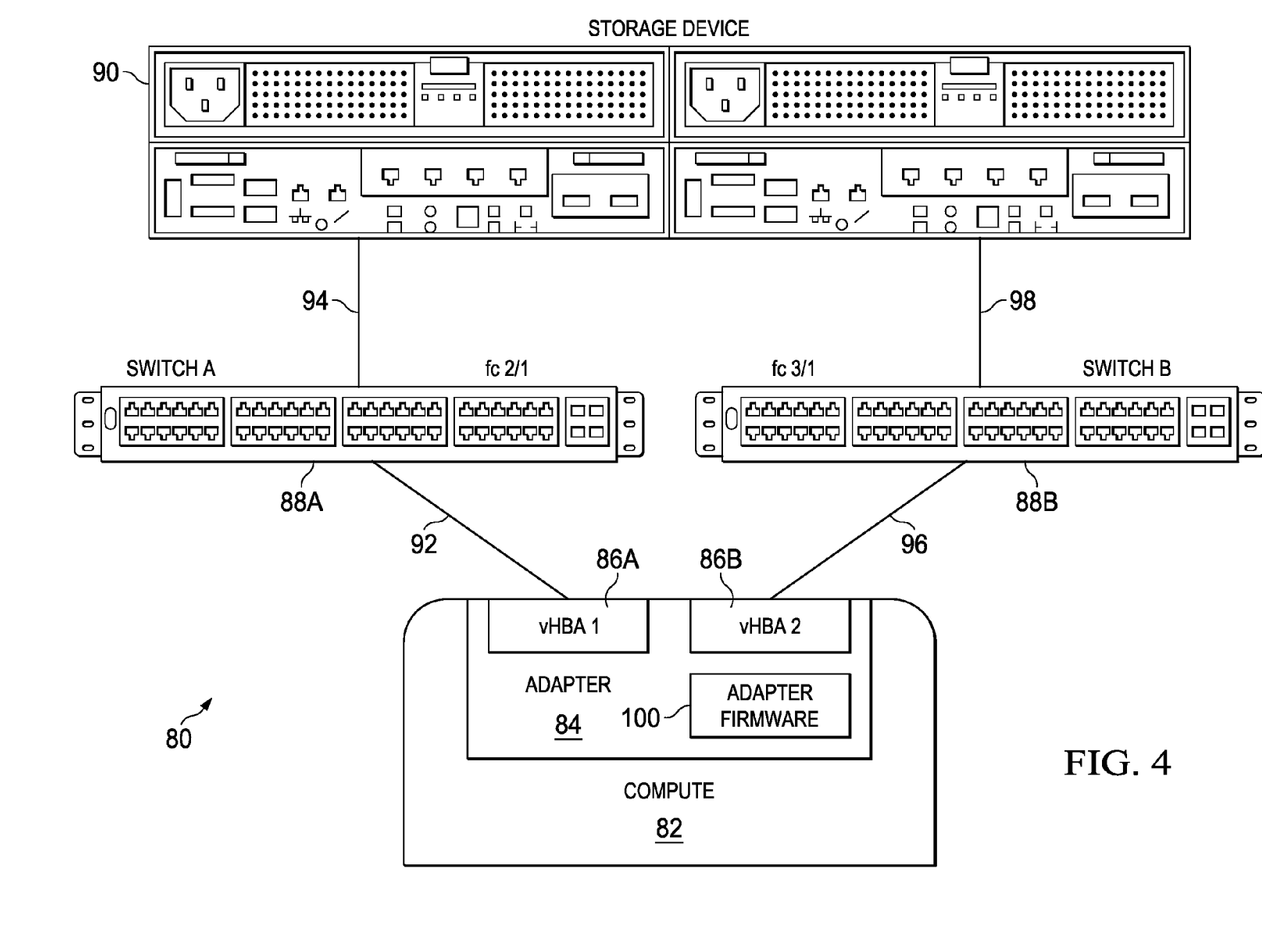
FIG. 4 illustrates a simplified block diagram of a system for selecting a least cost path for performing a network boot over fibre channel in a data center environment in accordance with one embodiment of the present disclosure.

Referring now to FIG. 3, illustrated therein is a system 50 for selecting a least cost path for booting a server 52 over iSCSI (Ethernet). The server 52 has installed thereon an adapter 54, which in one embodiment is implemented as a Cisco UCS 1280 VIC available from Cisco Systems, Inc. As illustrated in FIG. 4, two boot devices comprising an iSCSI vNIC1 56a and an iSCSI vNIC2 56B, have been instantiated on the adapter 54 as specified by a service profile associated with the server 52. The system 50 further includes two Ethernet switching devices 58A, 58B, which comprise the uplink interfaces to which the boot devices 56A, 56B, are respectively pinned. In accordance with features of embodiments described herein, vNIC1 56A logs into a storage array 60 via a first path including links 62, 64, and the switching device 58A and performs a LUN discovery process to locate the boot target. Similarly, vNIC2 56B logs into the storage array 60 via a second path including links 66, 68, and the switching device 58B and performs a LUN discovery process. Based on the network fabric patterns on fabric A, comprising links 62. 64 and the switching device 58A, and fabric B, comprising links 66, 68, and the switching device 58B, firmware 70 executing on the adapter 54 determines which is the least cost path to reach the LUN and posts the iBFT only on the vNIC 56A, 56B, that reports the least cost path.

Referring now to FIG. 4, illustrated therein is a system 80 for selecting a least cost path for booting a server 82 over SAN (FC or FCoE). The server 82 has installed thereon an adapter 84, which in one embodiment is implemented as a Cisco UCS 1280 virtual interface card ("VIC") available from Cisco Systems, Inc. As illustrated in FIG. 4, two boot devices comprising vHBAs 86A, 86B, have been instantiated on the adapter 82. The system 80 further includes two FC switching devices 88A, 88B, which comprise the uplink interfaces to which the boot devices 86A, 86B, are respectively loggin in the SAN fabric. In accordance with features of embodiments described herein, vHBA 86A logs into a storage array 90 via a first path including links 92, 94, and the switching device 88A, and performs a LUN discovery process. Similarly, vNIC2 56B logs into the storage array 90 via a second path including links 96, 98, and the switching device 88B and performs a LUN discovery process. Based on the network fabric patterns on fabric A, comprising links 92, 94, and the switching device 88A, and fabric B, comprising links 96, 98, and the switching device 88B, firmware 100 running on the adapter determines which is the least cost path to reach the LUN and post the iSCSI boot firmware table ("iBFT") only on the vNIC that reports the least cost path.

Figure 5:
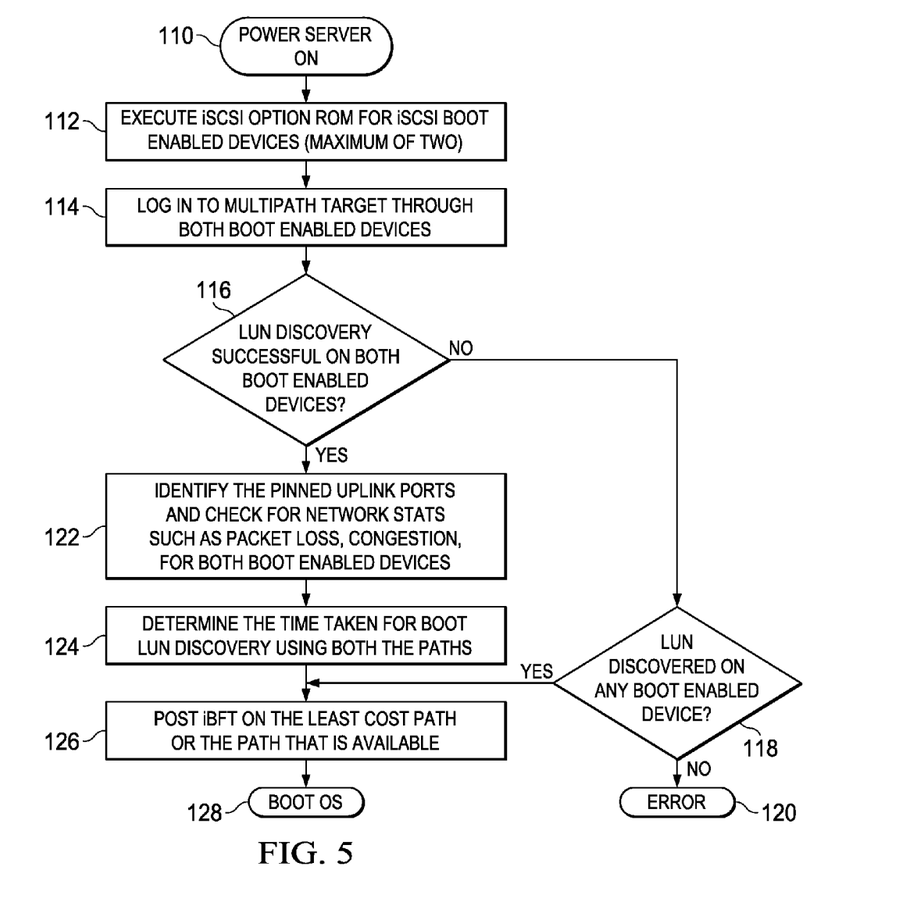
FIG. 5 is a flowchart illustrating a method for selecting a least cost path for performing a network boot in a data center environment in accordance with one embodiment of the present disclosure.

FIG. 5 illustrates a flowchart of a method for selecting a least cost path for performing a network boot in a data center environment in accordance with one embodiment of the present disclosure. In step 110, the server is powered on and ready to boot the OS. It will be noted that the server described in FIG. 5 has been deployed in accordance with a service profile specifying a dynamic, rather than static, boot prioritization in the boot policy thereof. In step 112, the server executes the iSCSI option ROM for a maximum of two iSCSI boot devices provisioned thereon. In step 114, the iSCSI option ROM logs in to the multipath target through both of the boot devices. In the example embodiment, the boot devices are vNICs. In step 116, a determination is made whether LUN discovery was successful on both boot devices/vNICs. If a negative determination is made in step 116, execution proceeds to step 118, in which a determination is made whether LUN discovery was successful on either of the boot devices/vNICs. If not, an error has occurred the operation terminates in step 120 without booting the OS.

If a positive determination is made in step 116, execution proceeds to step 122. In step 122, boot firmware of the virtualized adapter identifies the pinned uplink ports and checks for network statistics, such as packet loss, errors, congestion, etc., for both boot devices and their respective paths. In step 124, the firmware determines the time taken for boot LUN discovery using both paths. Execution then proceeds to step 126. Similarly, if a positive determination is made in step 118, execution proceeds to step 126. In step 126, the iBFT is posted on the least cost path determined in steps 122, 124, or on the available path determined in step 118. In step 128, the OS is booted on the server.

As a result of deployment of embodiments described herein, no out-of-band network monitoring or advanced quality of service configuration is involved in selecting the least cost path for performing network boot of a server. The embodiments further enable mass configuration through service profile deployment and section of a least cost path with no administration or BIOS involvement. A modified version can be used in a stand-alone rack server environment. The decision of the path taken is made before the host OS boots, therefore, the embodiments are BIOS and OS agnostic. The embodiments implement a policy-driven, self-healing approach to boot OSes.

It should be noted that much of the infrastructure discussed herein can be provisioned as part of any type of network device. As used herein, the term "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network devices may include any suitable hardware, software, components, modules, interfaces, or objects that facilitate the operations thereof. This may be inclusive of appropriate algorithms and communication protocols that allow for the effective exchange of data or information.

In one implementation, these devices can include software to achieve (or to foster) the management activities discussed herein. This could include the implementation of instances of any of the components, engines, logic, modules, etc., shown in FIG. 1. For example, one or more of the components of FIG. 1 may be embodied in a boot firmware module to achieve one or more of the activities discussed herein. Additionally, each of these devices can have an internal structure (e.g., a processor, a memory element, etc.) to facilitate some of the operations described herein as being implemented by modules. In other embodiments, these management activities may be executed externally to these devices, or included in some other network device to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that in certain example implementations, functions outlined herein may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagram illustrates only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    logging in to a multipath target via first and second boot devices instantiated on a network device, the first and second boot devices respectively connected to the multipath target via first and second paths;
    determining which of the first and second paths comprises a least cost path;
    determining whether boot LUN discovery was successful via the determined least cost path;
    if boot LUN discovery was successful via the determined least cost path, booting an operating system via the determined least cost path; and
    if boot LUN discovery was not successful via the determined least cost path, booting the operating system via the other one of the first and second paths.

2. The method of claim 1, wherein the determining further comprises comparing network statistics of the first path with network statistics of the second path.

3. The method of claim 2, wherein the network statistics comprise at least one of packet loss on the path, errors encountered via the path, and congestion on the path.

4. The method of claim 1, wherein the determining further comprises determining an amount of time needed to perform boot logical unit number ("LUN") discovery via each of the first and second paths.

5. The method of claim 1, wherein the booting comprises installing a boot firmware table on the least cost path.

6. The method of claim 1, wherein the first and second boot devices comprise network virtual interface cards ("vNICs") instantiated by a virtualized adapter.

7. The method of claim 1, wherein the first and second boot devices comprise virtual host bus adapters ("vHBAs") instantiated by a virtualized adapter.

8. The method of claim 1, wherein the multipath target comprises a storage array.

9. Logic encoded in one or more non-transitory tangible media that includes code for execution and when executed by a processor is operable to perform operations comprising:
    logging in to a multipath target via first and second boot devices instantiated on a network device, the first and second boot devices respectively connected to the multipath target via first and second paths;
    determining which of the first and second paths comprises a least cost path;
    determining whether boot LUN discovery was successful via the determined least cost path;
    if boot LUN discovery was successful via the determined least cost path, booting an operating system via the determined least cost path; and
    if boot LUN discovery was not successful via the determined least cost path, booting the operating system via the other one of the first and second paths.

10. The logic of claim 9, wherein the determining further comprises comparing network statistics of the first path with network statistics of the second path, the network statistics comprising at least one of packet loss on the path, errors encountered via the path, and congestion on the path.

11. The logic of claim 9, wherein the determining further comprises determining an amount of time needed to perform boot LUN discovery via each of the first and second paths.

12. The logic of claim 9, wherein the first and second boot devices are instantiated on the network device using a virtualized adapter and comprise one of virtual network interface cards ("vNICs") and virtual host bus adapters ("vHBAs").

13. A network device, comprising:
    a memory element configured to store data;
    a processor operable to execute instructions associated with the data; and
    a boot firmware module coupled to the processor, wherein the network device is configured to:
        cause first and second boot devices instantiated on the network device to log in to a multipath target via first and second paths, respectively;
        determine which of the first and second paths comprises a least cost path;
        determine whether boot LUN discovery was successful via the determined least cost path;

if boot LUN discovery was successful via the determined least cost path, boot an operating system via the determined least cost path; and if boot LUN discovery was not successful via the determined least cost path, boot the operating system via the other one of the first and second paths.

14. The network device of claim 13, wherein the determining comprises comparing network statistics of the first path with network statistics of the second path, the network statistics comprising at least one of packet loss on the path, errors encountered via the path, and congestion on the path.

15. The network device of claim 13, wherein the determining comprises determining an amount of time needed to perform boot LUN discovery via each of the first and second paths.

16. The network device of claim 13, wherein the first and second boot devices are instantiated on the network device using a virtualized adapter and comprise one of virtual network interface cards ("vNICs") and virtual host bus adapters ("vHBAs").

17. The network device of claim 13, wherein the multipath target comprises a storage array and the network device comprises a server.

* * * * *